United States Patent [19]
Chapman et al.

[11] Patent Number: 5,926,468
[45] Date of Patent: Jul. 20, 1999

[54] WIRELESS COMMUNICATIONS SYSTEMS AND METHODS UTILIZING DATA LINK RESET

[75] Inventors: Randy G. Chapman; Andrew S. Wright, both of Vancouver, Canada

[73] Assignee: Telefonaktiebolaget L M Ericsson, Stockholm, Sweden

[21] Appl. No.: 08/833,282

[22] Filed: Apr. 4, 1997

[51] Int. Cl.$^6$ ...................................................... H04Q 7/38
[52] U.S. Cl. ........................................... 370/328; 370/469
[58] Field of Search ...................................... 370/338, 328, 370/469, 401, 428, 465, 522; 340/825.5, 825.32

[56] References Cited

U.S. PATENT DOCUMENTS

| | | | |
|---|---|---|---|
| 4,445,214 | 4/1984 | Reynolds et al. ........................... | 370/94 |
| 4,791,639 | 12/1988 | Afheldt et al. .............................. | 370/58 |
| 5,007,051 | 4/1991 | Dolkas et al. ............................ | 370/85.1 |
| 5,130,993 | 7/1992 | Gutman et al. ............................ | 371/42 |
| 5,369,682 | 11/1994 | Witsaman et al. ......................... | 379/57 |
| 5,515,035 | 5/1996 | Gut ........................................ | 340/825.5 |
| 5,748,620 | 5/1998 | Capurka ................................... | 370/328 |

FOREIGN PATENT DOCUMENTS

WO 96/36146  11/1996  WIPO .

OTHER PUBLICATIONS

Tanenbaum, "Computer Networks," XP–002079137, Mar. 15, 1993, pp. 212–239.
International Search Report, PCT/IB98/00736, Oct. 15, 1998.
CDPD System Specification, Release 1.1, Jan. 19, 1995, pp. 403–428–403–430 and 403–440.

*Primary Examiner*—Chau Nguyen
*Assistant Examiner*—Eva Tang
*Attorney, Agent, or Firm*—Myers Bigel Sibley & Sajovec

[57] ABSTRACT

A Data Link is established for communicating messages between the first entity and the second entity via Information Frames communicated between a first Data Link Layer at the first entity and a second Data Link Layer at the second entity. An Information Frame addressed to the second Data Link Layer, preferably indicating a normal condition for the Data Link, is transmitted from the first Data Link Layer. The first and second Data Link Layers are reset if it is determined that a transmitted Information Frames fails to be communicated from the first Data Link Layer to the second Data Link Layer. An Information Frame addressed to the second Data Link Layer, preferably indicating a normal condition for the Data Link, is transmitted from the first Data Link Layer after the first and second Data Link Layers are reset. The Data Link preferably is maintained from the first step of transmitting through the second step of transmitting. Resetting preferably includes resetting the first Data Link Layer, communicating an Information Frame from the first Data Link Layer to the second Data Link Layer indicating a reset condition, resetting the second Data Link Layer in response to communication of the Information Frame to the second Data Link Layer indicating a reset condition, and communicating a frame acknowledging the reset condition from the second Data Link Layer to the first Data Link Layer.

27 Claims, 7 Drawing Sheets

WIRELESS COMMUNICATIONS SYSTEMS AND METHODS UTILIZING DATA LINK RESET

FIELD OF THE INVENTION

The present invention relates to data communications systems and methods, more particularly, to systems and methods for controlling a data link in a wireless communications system.

BACKGROUND OF THE INVENTION

Figure 1:
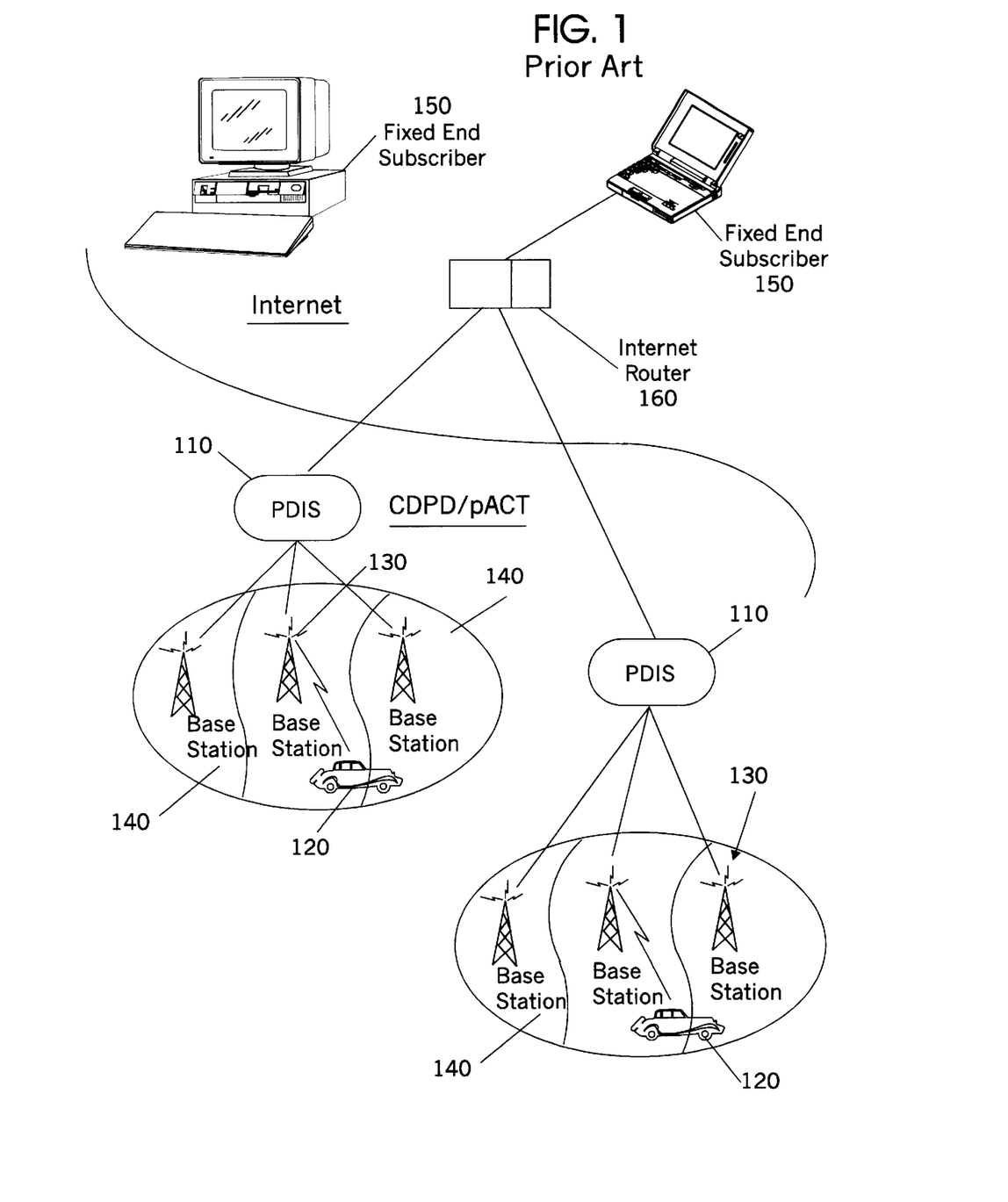
FIG. 1 illustrates a communications system according to the prior art.

FIG. 1 illustrates a typical cellular packet data communications network architecture, specifically, an architecture typically employed in Cellular Digital Packet Data (CDPD) and personal Air Communications Technology (pACT) networks. The network may include a pACT Data Intermediate System (PDIS) 110, a specialized router that allows a subscriber unit 120 to move among cells 140 without losing connectivity within a fixed infrastructure network such as an internet. In particular, the PDIS 110 typically provides mobility management by constructing and continuously updating a directory/routing table that maps subscriber unit IP addresses to a temporary address and channel stream that identify with which base station 130 the subscriber unit 120 is currently connected. Typically, in order to communicate between two data link entities, for example, two subscriber units 120 or a subscriber unit 120 and PDIS 110, a data link is established between the entities over which frames or packets are communicated, with intermediate links between the subscriber unit 120, base station 130 and PDIS 110 being transparent to the entities on the ends of the data link.

Wireless environments can present several challenges to designers of communications systems, including limited bandwidth and extreme fading environments. In extreme fading environments, subscriber units may temporarily be unable to acquire signals transmitted by base stations or base stations may be unable to acquire signals from subscriber units, rendering two data link entities connected over an airlink unable to communicate. In conventional systems, if contact between subscriber unit and base station is lost for a long enough period of time, the transmitting entity typically declares the connection failed and takes action to attempt to re-establish the connection. An example of a conventional data link protocol which re-establishes a data link after transmission failure is the Mobile Data Link Protocol (MDLP) used in CDPD and pACT systems, as described in the *CDPD System Specification,* Release 1.1, published by CDPD Forum, Inc., Jan. 19, 1995, the disclosure of which is herein incorporated by reference in its entirety. MDLP strives to re-establish the data link connection as soon as frame delivery fails, that is, after the transmitting entity has performed a defined number of attempts to deliver a frame without receiving acknowledgment from the receiving entity. Reestablishment of the link typically requires a relatively complex handshaking procedure including the transmission of various supervisory messages. Given that a failed data link connection probably has been poor for a relatively long period of time before re-establishment is attempted, data link re-establishment will likely also fail, thus possibly wasting valuable bandwidth which could have been otherwise utilized to transport revenue-bearing traffic.

SUMMARY OF THE INVENTION

In light of the foregoing, it is an object of the present invention to provide systems and methods for resetting a data link which has reduced overhead to more efficiently utilize system bandwidth.

This and other objects, features and advantages are provided according to the present invention by communications systems and methods in which an established Data Link is reset by communicating a frame indicating a reset condition from a first Data Link Layer at a first entity to a second Data Link Layer at a second entity and acknowledging the reset condition in a frame communicated from the second Data Link Layer to the first Data Link Layer, while continuing to maintain the Data Link. Preferably, the Data Link Layers include respective state machines which control the transmission and reception of frames, with the state machines including state variables corresponding to sequence numbers included in frames communicated between the Data Link Layers of the respective first and second entities. Upon failure to communicate a first and second frame between the Data Link Layers, for example, after a predetermined number of attempts, the state machines preferably are reset to predetermined states to restart the sequencing of frames between the Data Link Layers. A respective entity preferably includes a respective Store and Forward/Sync Layer above the corresponding Data Link Layer, which provides for storage of messages for which corresponding frames may be lost during reset of the Data Link, such that frames corresponding to the uncommunicated messages may be communicated after the Data Link is restored to a normal condition.

According to the invention, indication of a reset condition can be carried in an information frame, rather than sending a reset command in a supervisory frame. Thus, the Data Link may be reset without requiring the overhead which may be associated with reestablishing the Data Link after a communications failure.

In particular, according to the present invention, a Data Link is established for communicating messages between the first entity and the second entity via Information Frames communicated between a first Data Link Layer at the first entity and a second Data Link Layer at the second entity. An Information Frame addressed to the second Data Link Layer, preferably indicating a normal condition for the Data Link, is transmitted from the first Data Link Layer. The first and second Data Link Layers are reset if it is determined that a transmitted Information Frames fails to be communicated from the first Data Link Layer to the second Data Link Layer, while maintaining the Data Link. An Information Frame addressed to the second Data Link Layer, preferably indicating a normal condition for the Data Link, is transmitted from the first Data Link Layer after the first and second Data Link Layers are reset. The Data Link preferably is maintained from the first step of transmitting through the second step of transmitting. Resetting the first and second Data Link Layers preferably includes resetting the first Data Link Layer, communicating an Information Frame from the first Data Link Layer to the second Data Link Layer indicating a reset condition, resetting the second Data Link Layer, in response to communication of the Information Frame to the second Data Link Layer indicating a reset condition, and communicating a frame acknowledging the reset condition from the second Data Link Layer to the first Data Link Layer. Communicating an Information Frame indicating a reset condition preferably includes repeatedly transmitting Information Frames indicating a reset condition from the first Data Link Layer until a frame acknowledging the reset condition indication is communicated to the first Data Link Layer.

According to a preferred aspect of the invention, the first Data Link Layer includes a first state variable representing a sequence number of a next Information Frame to be communicated from the first Data Link Layer to the second Data Link Layer, and the second Data Link Layer includes a second state variable representing a sequence number of a next Information Frame expected to be communicated to the second Data Link Layer from the first Data Link Layer. Resetting the first Data Link Layer includes setting the first state variable to a first predetermined value, and communicating an Information Frame indicating a reset condition includes communicating an Information Frame indicating a reset condition and including a sequence number having the first predetermined value. Resetting the second Data Link Layer includes setting the second state variable to the predetermined value, and communicating a frame acknowledging the reset condition includes communicating a frame acknowledging the reset condition and including a sequence number having the predetermined initial value.

According to another preferred aspect, the first step of transmitting is preceded by storing at least one message at the first entity, converting at least one message addressed to the second entity into a first group of Information Frames, and queuing the first group of Information Frames at the first Data Link Layer. The first step of transmitting includes transmitting an Information Frame from the queued first group of Information Frames. Resetting the first Data Link Layer includes discarding Information Frames queued at the first Data Link Layer. The second step of transmitting is preceded by converting stored messages of the at least one message corresponding to discarded Information Frames into a second group of Information Frames and queuing the second group of Information Frames at the first Data Link Layer. The second step of transmitting includes transmitting an Information Frame from the queued second group of Information Frames. Reliable communication of messages over the Data Link is thereby provided.

BRIEF DESCRIPTION OF THE DRAWINGS

Some of the objects and advantages of the present invention having been stated, others will be more fully understood from the detailed description that follows and by reference to the accompanying drawings in which.

DETAILED DESCRIPTION OF PREFERRED EMBODIMENTS

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements throughout.

Automatic data link reset according to the present invention will be described with reference to layered "protocol stacks." Those skilled in the art will appreciate that protocol stacks as described herein may represent hardware elements, software elements or combinations thereof. In a communications system such as CDPD or pACT in which network entities include various computer objects or programs running on varying hardware platforms and/or operating systems, layers of the protocol stacks may be "virtual," i.e., temporary objects or entities created by a computer program running on the platforms. The various protocol layers enable applications resident at the network entities at higher protocol layers to communicate in a transparent fashion by managing hardware and software particular to the platform at lower protocol layers. Thus, for example, a Data Link may be established between two entities, typically between higher level protocol layers at the entities, to communicate messages between the entities using packets of data corresponding to portions of the messages, communicated between lower level protocol layers at the entities.

Figure 2:
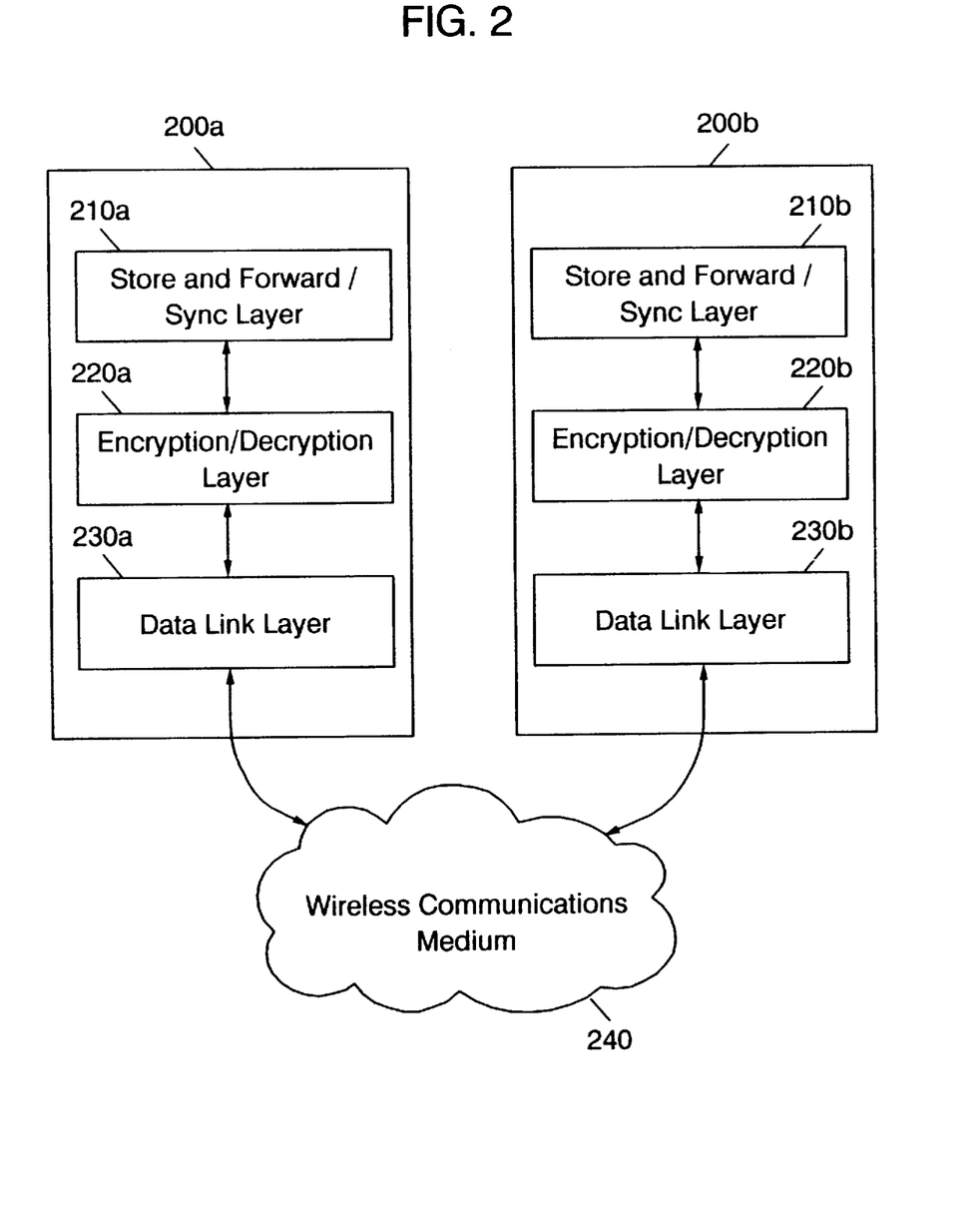
FIG. 2 illustrates a communications system according to the present invention.

As illustrated in FIG. 2, protocol stacks 200a, 200b situated at first and second entities, for example, a pACT Data Intermediate System (PDIS) and a subscriber unit such as a personal communication system (PCS) terminal, each include multiple "layers" which communicate with one another. Preferably, each of the protocol stacks 200a, 200b includes a Store and Forward/Sync Layer 210a, 210b which stores messages for subsequent forwarding. The protocol stacks 200a, 200b may also include an Encryption/Decryption Layer 220a, 220b which provides encrypted "frames," i.e., discrete blocks of data which represent portions of messages stored at the Store and Forward/Sync Layers 210a, 210b to Data Link Layers 230a, 230b, and which decrypts encrypted frames received from the Data Link Layers 230a, 230b to produce messages for storage and forwarding by the Store and Forward/Sync Layers 210a, 210b. The Data Link Layers 230a, 230b may communicate frames including Data Link level control information and/or information corresponding to messages stored at the Store and Forward/Sync Layers 210a, 210b, preferably over a wireless communications medium 240.

Those skilled in the art will appreciate that, in general, a "frame" may include various numbers of symbols, bits or similar information units, arranged in various fields, words and similar structures. Those skilled in the art will also appreciate that various types of frames may be communicated between entities. For example, CDPD systems typically include "Supervisory Frames" which are used to communicate control information for Data Link level activities such as handshaking, but may not include message content, i.e., information to be conveyed between protocol layers higher that the Data Link Layers. CDPD also defines "Information Frames" which include portions of messages and are communicated at the Data Link level. Various frame structures utilized in CDPD are described in detail in the CDPD System Specification.

Figure 3:
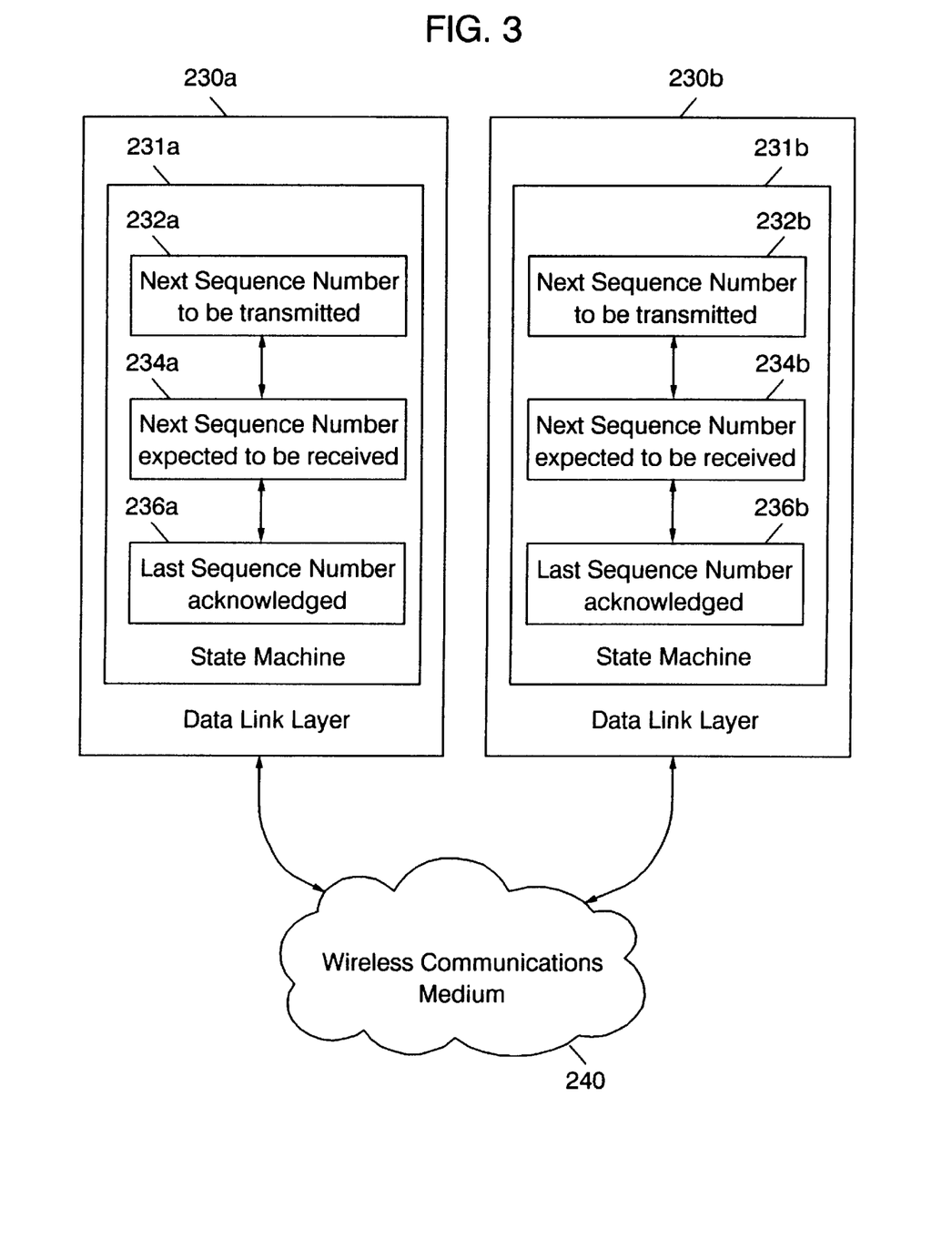
FIG. 3 illustrates Data Link Layers in a communications system according the present invention.

As illustrated in FIG. 3, establishing a Data Link Layer 230a, 230b preferably includes establishing a state machine 231a, 231b which controls transmission and reception of frames between the Data Link Layers 230a, 230b. Preferably, the state machines 231a, 231b each include a first state variable 232a, 232b representing a sequence number of a next frame to be transmitted, and a second state variable 234a, 234b representing a second number of a next frame expected to be received by the Data Link Layer 230a, 230b. The state machine for an entity may also include a third state variable 236a, 236b representing a sequence number of a last frame transmitted by the entity which was acknowledged by the other entity.

Figure 4A:
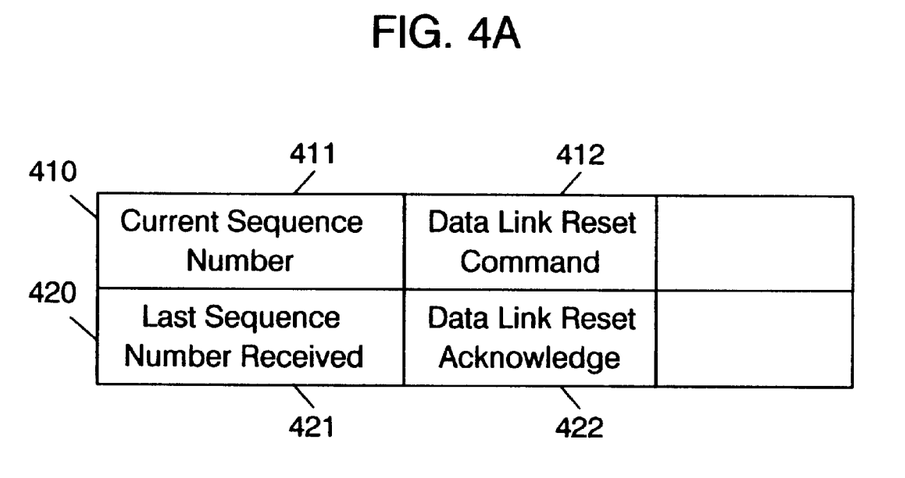
FIGS. 4A–4B illustrate frames communicated between entities in a communications system according to the present invention.
Figure 4B:
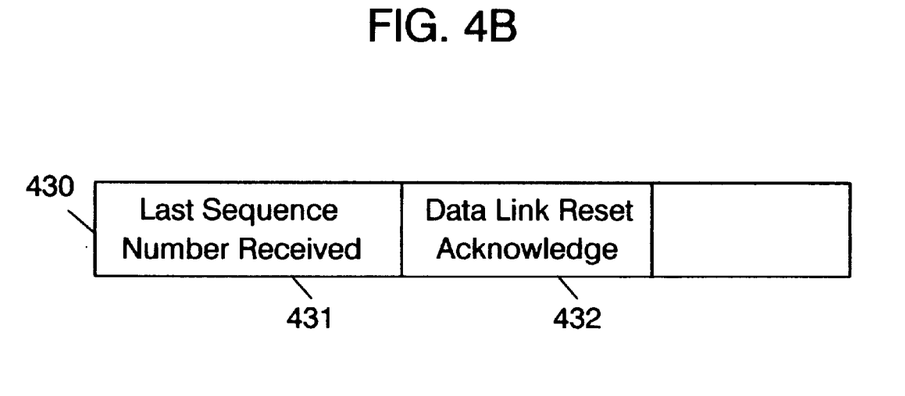

Preferred embodiments of frames are illustrated in FIGS. 4A–4B. FIG. 4A illustrates an Information Frame 401, which includes multiple words or segments 410, 420. The Information Frame 410 preferably includes a Data Link Reset Command field 412 which is used by a transmitting entity to indicate whether the Data Link is in a normal or a reset condition. For example, the Data Link Reset Command field 412 may be a bit which is set to a predetermined value when the transmitting entity detects a failure to successfully communicate a predetermined number of Information Frames, e.g., by failing to receive frames acknowledging receipt by a receiving entity. As described in greater detail below, the indication provided by the Data Link Reset Command field 412 may be used to trigger a reset procedure at the receiving entity which receives the Information Frame including the Data Link Reset Command field 412.

As Information Frames may be used by the receiving entity to acknowledge receipt of other Information Frames, the Information Frame 410 also preferably includes a Data Link Reset Acknowledge field 422 which may used by the receiving entity to acknowledge receipt of an Information Frame which indicates a reset condition. For example, the Data Link Reset Acknowledge field 422 may be a bit which is set to a predetermined value to acknowledge a reset condition, and set to another value once the reset condition is cleared. As described in greater detail below, an entity receiving an Information Frame including the Data Link Reset Acknowledge field 422, e.g., the "transmitting entity" referred to above, may use the information provided by the Data Link Reset Acknowledge field 422 to signal an end to a reset condition, allowing the transmitting entity to resume normal transmission of Information Frames over the Data Link.

The Information Frame 410 also preferably includes a field 411 corresponding to the current sequence number of the frame and a field 421 corresponding to the sequence number of the last frame received by the entity transmitting the frame 401. These sequence number fields may be used by the Data Link Layers 230a, 230b to control transmission and reception of frames over the Data Link, as discussed in greater detail below.

Acknowledgment of a reset condition may also be communicated using other types of frames than Information Frames. For example, as illustrated in FIG. 4B, a Supervisory Frame 402 may include a Data Link Reset Acknowledge field 432 for acknowledging a reset condition for the Data Link, as well as field 431 corresponding to the sequence number of the last frame received by the entity transmitting the frame 402, which may be used in resetting the Data Link Layers 130a, 130b.

Figure 5:
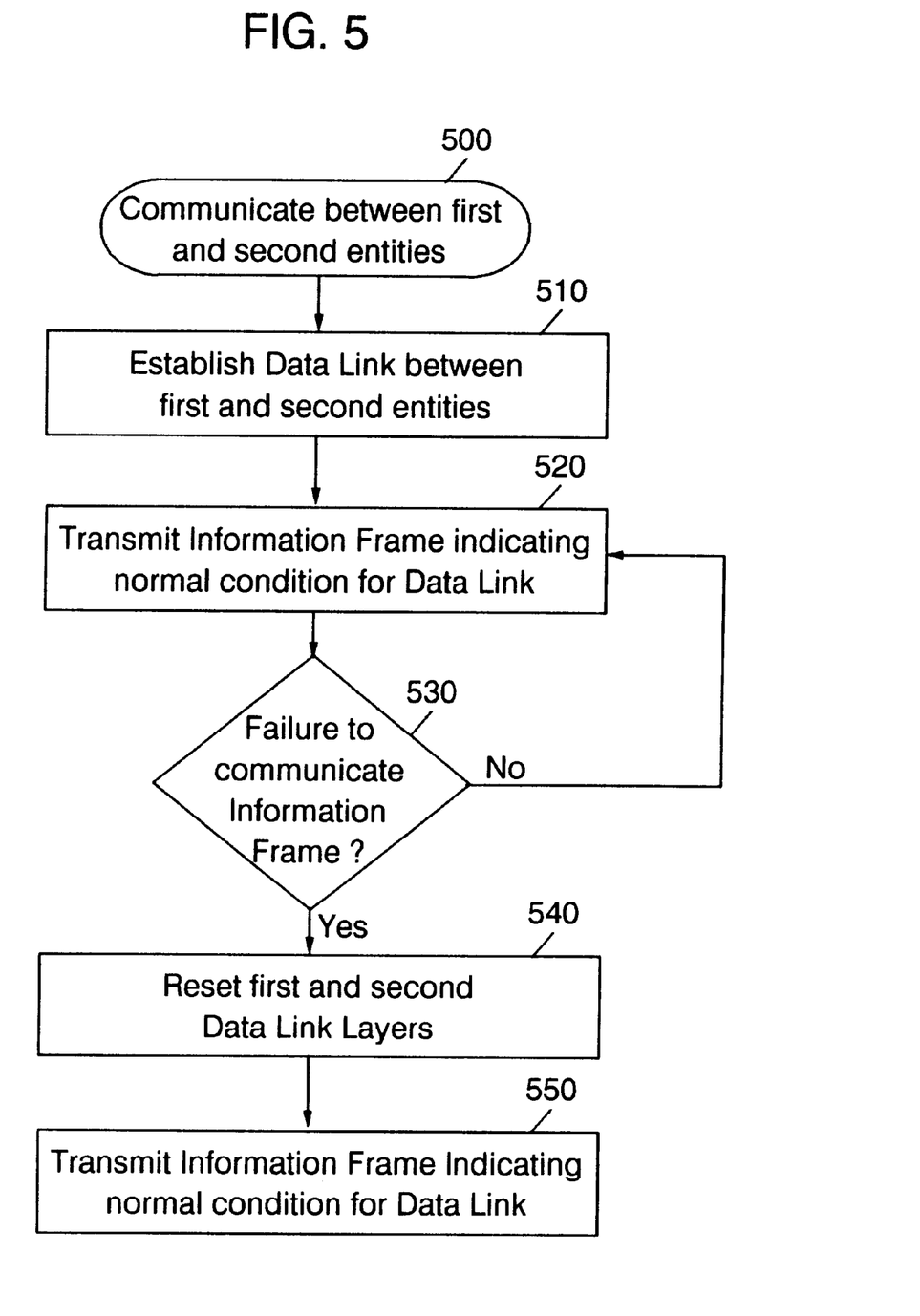
FIGS. 5 and 6A–6B illustrate operations for communicating between first and second entities in a communications system according to the present invention.
Figure 6A:
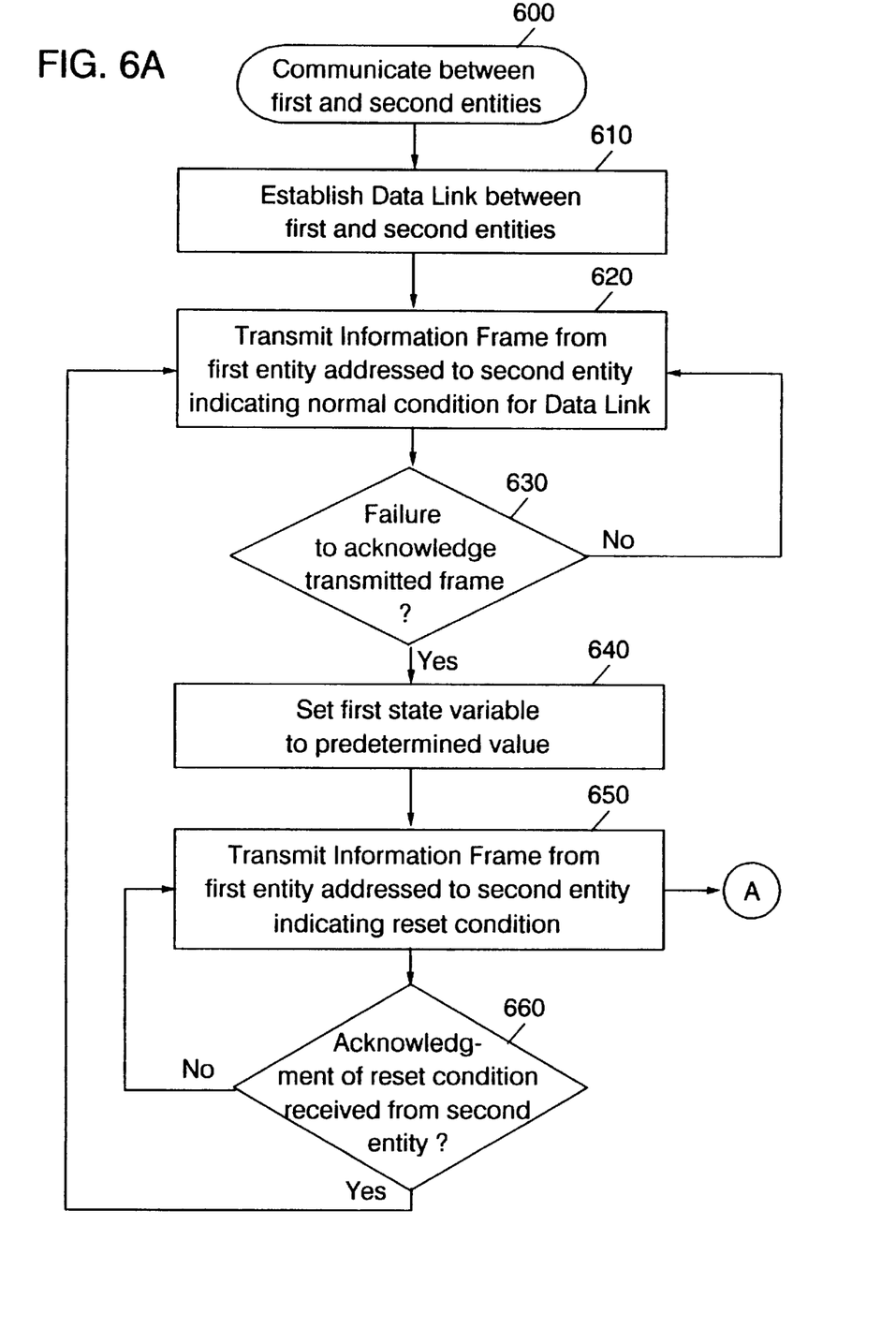
Figure 6B:
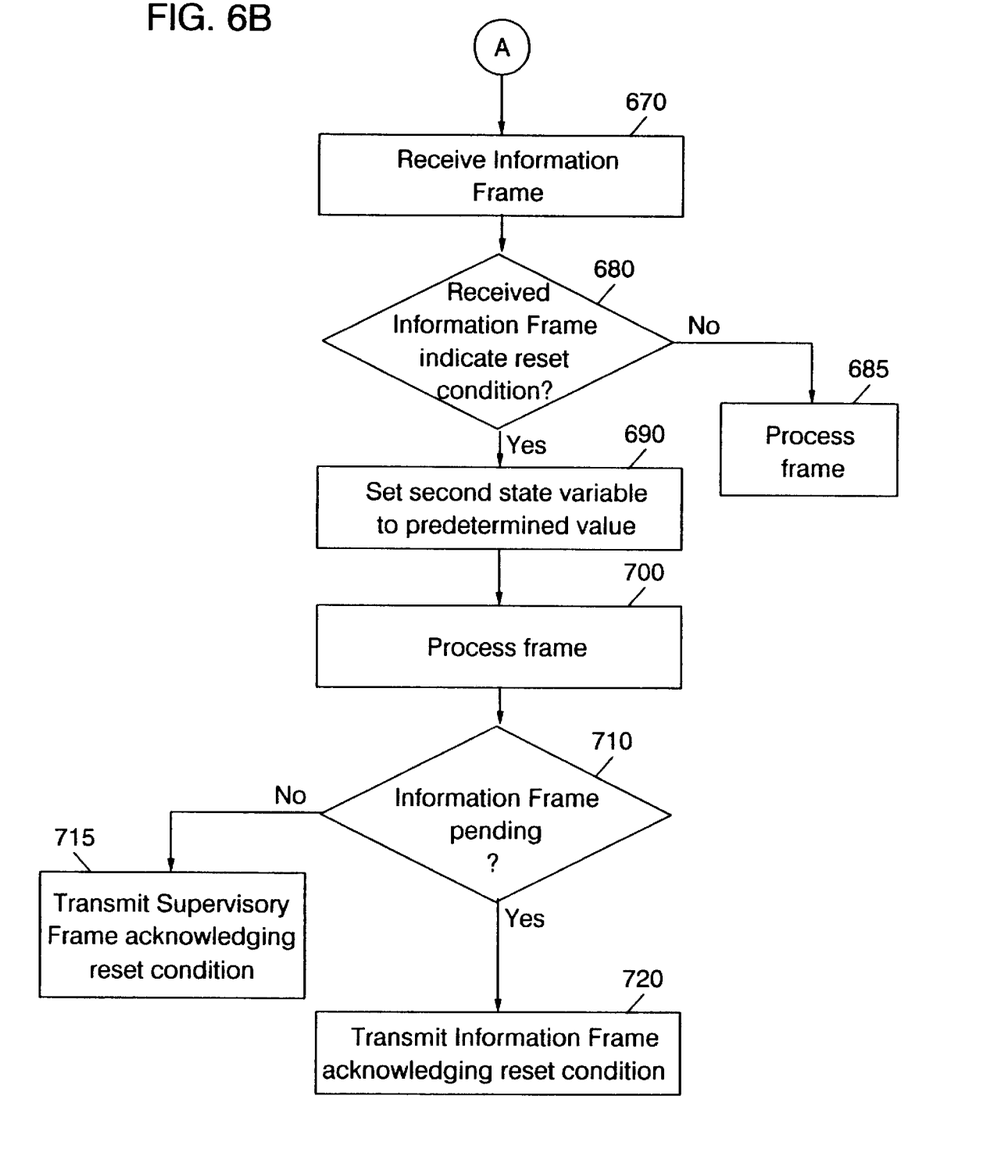

FIGS. 5 and 6A–6B are flowchart illustrations of methods and apparatus (systems) for communicating between first and second entities, preferably over a wireless communications medium. Those skilled in the art will understand that each block of the flowchart illustrations, and combinations of blocks in the flowchart illustrations, may be implemented in various components of a communications system, such as subscriber units, routers, PDIS's, and base stations in a cellular data communications systems such as CDPD and pACT. It will also be understood that portions of the operations described in the flowchart illustrations may be executed as computer program instructions loaded in a computer or other data processing apparatus included in the communications system, thus producing a machine which provides means for implementing the functions specified in the flowchart blocks and combinations thereof. The computer program may cause operational steps to be performed on the computer or data processing apparatus to produce a computer-implemented process such that the instructions which execute on the computer or data processing apparatus provide steps for implementing the functions of the flowchart blocks or combinations thereof. Accordingly, blocks of the flowchart illustrations support combinations of means for performing the specified functions and combinations of steps for performing the specified functions.

Those skilled in the art will appreciate that the means illustrated by the flowchart illustrations may be implemented using components commonly used in communications systems, such as antennas, transmitters, receivers, multiplexers, modulators, demodulators, signal processors and the like. The operation of these components is well known to those of skill in the art, and need not be discussed in greater detail herein. It will be understood that the means described may be implemented using special purpose hardware, general purpose computers or other data processing apparatus running software, or combinations thereof.

Operations for communicating between first and second entities according to the present invention are illustrated in FIG. 5 (Block 500). A Data Link is established between first and second entities, for communicating messages via Information Frames communicated between first and second Data Layers located at the first and second entities, respectively (Block 510). Those skilled in the art will appreciate that establishment of a Data Link may occur in a number of different ways, for example, by a handshaking procedure. An example of a Data Link establishment procedure in a CDPD system is provided in the *CDPD System Specification*, Paragraph 6.3.

An Information Frame addressed to the second Data Link Layer, preferably indicating a normal condition for the Data Link, is transmitted from the first Data Link Layer (Block 520). If it is determined that the transmitted Information Frame is not communicated to the second Data Link Layer (Block 530), the first and second Data Link Layers are reset (Block 540). Those skilled in the art will appreciate that a failure to communicate an Information Frame may occur in a number of different ways. For example, a failure may be declared after an entity attempts to transmit an Information Frame a predetermined number of times without receiving an acknowledgment that the Information Frame has been received. Those skilled in the art will appreciate that other ways of determining a communication failure may be used with the present invention, for example, by waiting until a predetermined number of Information Frames go unacknowledged during a predetermined time period. After resetting the first and second Data Link Layers, transmission of Information Frames indicating a normal condition for the Data Link may then resume (Block 550). The Data Link is maintained through the reset operation, thus avoiding the need to establish a new Data Link each time a communication failure occurs.

Detailed operations for communicating between first and second entities according to the present invention are illustrated in FIGS. 6A–6B (Block 600). A Data Link is established between the first and second entities (Block 610). In establishing the Data Link, first and second state machines are established at the first and second entities, respectively, for controlling transmission and reception of frames at the entities. At least one Information Frame is transmitted from the first entity indicating a normal condition for the Data Link (Block 620). As long as the first entity receives acknowledgment of the Information Frames it transmits, it continues to transmit frames indicating a normal condition (Blocks 630, 620). If the first entity fails to receive acknowledgment for a predetermined number of Information Frames transmitted by the first entity (Block 630), a first state variable included in the first state machine, corresponding to the sequence number of the next frame to be transmitted by the first entity, is set to a predetermined value (Block 640), and an Information Frame indicating a reset condition and including a sequence number having the predetermined value is then transmitted (Block 650). Preferably, the first entity continues to transmit Information Frames indicating a reset condition until acknowledgment is received from the second entity (Blocks 660, 650). The sequence numbers in these frames may be incremented to uniquely identify each frame and allow the receiving entity to process these frames in the same manner as normal Information Frames. Once an acknowledgment of the reset condition is received, transmission of normal Information Frames may then resume (Block 620).

Referring now to FIG. 6B, the second entity receives an Information Frame transmitted by the first entity (Block 670). If the received Information Frame does not indicate a reset condition, the frame is processed, e.g., conveyed to the higher protocol layers (Blocks 680, 685). If the received Information Frame does indicate a reset condition, a second state variable in the second state machine, corresponding to the sequence number of the next frame the second entity expects to receive, is set to a predetermined value (Blocks 680, 690). The Information Frame is then processed like a normal frame, e.g. conveyed to the higher protocol layers (Block 700). If the second entity has one or more Information Frames pending to be transmitted to the first entity, an Information Frame which acknowledges the reset condition may then be transmitted (Blocks 710, 720). If no Information Frames are pending, a Supervisory Frame acknowledging the reset condition may be transmitted (Blocks 710, 715). The second entity may continue to receive Information Frames from the first entity which indicate a reset condition, and may process them as regular Information Frames, thus allowing the Data Link to be maintained during the reset. The second entity may continue to transmit frames acknowledging the reset condition until a frame indicating a normal condition is received from the first entity. The sequence numbers in these frames may be incremented to uniquely identify each frame.

Those skilled in the art will appreciate that many variations to the operations described above may be used with the present invention. For example, before transmitting a frame indicating a reset condition, the first entity, e.g., the Data Link Layer at the first entity, may discard pending frames which have not been acknowledged by the Data Link Layer at the second entity. As the Data Link Layers at the first and second entities may not discern message boundaries, the Data Link Layer at the first entity could discard pending frames which have yet to be transmitted from the first entity. The higher-level Store and Forward/Sync Layer at the first entity preferably stores messages corresponding to these frames, so that after reset of the Data Link, information frames corresponding to these messages may be communicated. The Data Link Layer may send an indication to the Encryption/Decryption Layer that a Data Link reset has been commanded, e.g., by transmitting a frame which indicates a reset condition, and the Encryption/Decryption Layer may use this indication to initiate a resynchronization of encryption engines included in the Encryption/Decryption Layer. The Data Link Layer at the first entity may also send an indication to the Encryption/Decryption Layer that the reset command has been acknowledged by the second entity, which the Encryption/Decryption Layer may use as a confirmation that synchronization has been restored.

In the drawings and specification, there have been disclosed typical embodiments of the invention and, although specific terms are employed, they are used in a generic and descriptive sense only and not for purposes of limitation, the scope of the invention being set forth in the following claims.

That which is claimed is:

1. A method of communicating between a first entity and a second entity over a wireless communications medium, the method comprising the steps of:

establishing a Data Link for communicating messages between the first entity and the second entity via Information Frames communicated between a first Data Link Layer at the first entity and a second Data Link Layer at the second entity;

transmitting an Information Frame addressed to the second Data Link Layer from the first Data Link Layer;

determining whether the transmitted Information Frame is communicated to the second Data Link Layer;

resetting the first and second Data Link Layers while maintaining the Data Link, if a transmitted Information Frames fails to be communicated from the first Data Link Layer to the second Data Link Layer;

transmitting an Information Frame addressed to the second Data Link Layer from the first Data Link Layer, after said step of resetting.

2. A method according to claim 1, wherein the Data Link persists from said first step of transmitting through said second step of transmitting.

3. A method according to claim 1:

wherein said first step of transmitting comprises the step of transmitting an Information Frame which indicates a normal condition for the Data Link;

wherein said step of resetting comprises the steps of:
resetting the first Data Link Layer;
communicating an Information Frame from the first Data Link Layer to the second Data Link Layer indicating a reset condition;
resetting the second Data Link Layer in response to communication of the Information Frame to the second Data Link Layer indicating a reset condition; and
communicating a frame acknowledging the reset condition from the second Data Link Layer to the first Data Link Layer; and wherein said second step of transmitting comprises the step of transmitting an Information Frame indicating a normal condition for the Data Link in response to communication of the frame acknowledging the reset condition to the first Data Link Layer.

4. A method according to claim 3:

wherein said step of establishing comprises the step of defining a first state variable representing a sequence number of a next Information Frame to be communicated from the first Data Link Layer to the second Data Link Layer, at the first Data Link Layer, and a second state variable representing a sequence number of a next Information Frame expected to be communicated to the second Data Link Layer from the first Data Link Layer, at the second Data Link Layer;

wherein said step of resetting the first Data Link Layer comprises the step of setting the first state variable a predetermined value;

wherein said step of communicating an Information Frame indicating a reset condition comprises the step of communicating an Information Frame indicating a reset condition and including a sequence number having the predetermined value;

wherein said step of resetting the second Data Link Layer comprises the step of setting the second state variable to the predetermined value; and wherein said step of communicating a frame acknowledging the reset condition comprises the step of communicating a frame acknowledging the reset condition and including a sequence number having the predetermined value.

5. A method according to claim 3, wherein said first step of transmitting is preceded by the steps of:

storing a message at the first entity;

converting the stored message into a first group of Information Frames; and queuing the first group of Information Frames at the first Data Link Layer;

wherein said first step of transmitting comprises the step of transmitting an Information Frame from the queued first group of Information Frames;

wherein said step of resetting the first Data Link Layer comprises the step of discarding Information Frames queued at the first Data Link Layer;

wherein said second step of transmitting is preceded by the step of:

converting a stored message corresponding to a discarded Information Frames into a second group of Information Frames; and queuing the second group of Information Frames at the first Data Link Layer; and wherein said second step of transmitting comprises the step of transmitting an Information Frame from the queued second group of Information Frames.

6. A method according to claim 3, wherein said step of communicating an Information Frame indicating a reset condition comprises the step of repeatedly transmitting Information Frames indicating a reset condition from the first Data Link Layer until a frame acknowledging the reset condition indication is communicated to the first Data Link Layer.

7. A method of communicating between a first entity and a second entity over a wireless communications medium, the method comprising the steps of:

establishing a Data Link for communicating messages between the first and second entities via frames;

transmitting a frame from the first entity addressed to the second entity indicating a normal condition for the Data Link;

determining if a frame transmitted from the first entity is acknowledged by the second entity;

transmitting a frame from the first entity addressed to the second entity indicating a reset condition for the Data Link, if a frame addressed to the second entity fails to be acknowledged;

receiving the frame indicating the reset condition, at the second entity;

transmitting a frame from the second entity addressed to the first entity acknowledging the reset condition, in response to receipt of the frame indicating the reset condition at the second entity;

receiving the frame acknowledging the reset condition, at the first entity; and transmitting a frame from the first entity addressed to the second entity indicating a normal condition for the Data Link, in response to receipt of the frame acknowledging the reset condition at the first entity.

8. A method according to claim 7:

wherein said step of establishing a Data Link comprises the step of establishing a first state machine which controls transmission and reception of frames by the first entity and a second state machine which controls transmission and reception of frames by the second entity;

wherein said step of transmitting a frame indicating a reset condition is preceded by the step of resetting the first state machine to a predetermined state if a frame addressed to the second entity fails to be acknowledged; and wherein said step of receiving the frame indicating a reset condition is followed by the step of resetting the second state machine to a predetermined state in response to receipt of a frame indicating the reset condition.

9. A method according to claim 8:

wherein said step of establishing comprises the step of establishing a first state machine including a first state variable representing a sequence number of a next frame to be transmitted by the first entity, and a second state machine including a second state variable representing a sequence number of a next frame expected to be received from the first entity at the second entity;

wherein said step of resetting the first state machine comprises the step of setting the first state variable to a predetermined value;

wherein said step of transmitting a frame indicating a reset condition comprises the step of transmitting a frame indicating the reset condition and including a sequence number having the first predetermined value;

wherein said step of resetting the second state machine comprises the step of setting the second state variable to the predetermined value; and wherein said step of transmitting a frame acknowledging the reset condition comprises the step of transmitting a frame acknowledging the reset condition and including a sequence number having the predetermined value.

10. A method according to claim 7, wherein said step of transmitting a frame indicating a reset condition comprises the step of repeatedly transmitting frames indicating the reset condition until a frame acknowledging the reset condition indication is received at the first entity.

11. A method of resetting a Data Link established to communicate messages between a first entity and second entity over a wireless communications medium via frames, the first entity including a first state machine which controls transmission and reception of frames by the first entity, the second entity including a second state machine which controls transmission and reception of frames by the second entity, the method of resetting comprising the steps of:

determining whether a frame transmitted from the first entity is acknowledged by the second entity;

resetting the first state machine to a predetermined state if a frame addressed to the second entity fails to be acknowledged by the second entity;

transmitting a frame from the first entity addressed to the second entity indicating a reset condition, if a frame addressed to the second entity fails to be acknowledged;

receiving the frame indicating the reset condition, at the second entity;

resetting the second state machine to a predetermined state in response to receipt of the frame indicating the reset condition; and transmitting a frame from the second entity addressed to the first entity acknowledging the reset condition.

12. A method according to claim 11, wherein the first state machine includes a first state variable representing a sequence number of a next frame to be transmitted by the first entity, wherein the second state machine includes a second state variable representing a sequence number of a next frame expected to be received from the first entity at the second entity, and:

wherein said step of resetting the first state machine comprises the step of setting the first state variable to a predetermined value;

wherein said step of transmitting a frame indicating a reset condition comprises the step of transmitting a frame indicating the reset condition and including a sequence number having the predetermined value;

wherein said step of resetting the second state machine comprises the step of setting the second state variable to the predetermined value; and wherein said step of transmitting a frame acknowledging the reset condition comprises the step of transmitting a frame acknowledging the reset condition and including a sequence number having the predetermined value.

13. A method according to claim 11, wherein said step of transmitting a frame indicating a reset condition comprises the step of repeatedly transmitting frames indicating the reset condition until a frame acknowledging the reset condition indication is received at the first entity.

14. A method according to claim 11, wherein said step of transmitting a frame acknowledging the reset condition is followed by the steps of:

transmitting a frame from the first entity addressed to the second entity indicating a normal condition for the Data Link.

15. A method of communicating between a first entity and a second entity over a wireless communications medium, the method comprising the steps of:

establishing a Data Link for communicating messages between the first and second entities via frames communicated between the first and second entities, the Data Link including first and second state machines for controlling transmission and reception of frames at the first and second entities, respectively; and resetting the first and second state machines to first and second predetermined states while maintaining the Data Link, respectively, in response to a failure to communicate a frame between the first and second entities.

16. A method according to claim 15, wherein the Data Link persists beyond said step of resetting.

17. A method according to claim 15:

wherein said step of establishing comprises the step of establishing a first state machine including a first state variable representing a sequence number of a next Information Frame to be communicated from the first entity to the second entity, and a second state machine including a second state variable representing a sequence number of a next Information Frame expected to be communicated to the second entity from the first entity;

wherein said step of resetting is preceded by the steps of:
setting the first and second state variables to a first value;

communicating a frame from the first entity to the second entity including a field having the first value;

communicating a frame from the second entity to the first entity including a field having the first value;

incrementing the first and second state variables to a second value;

communicating a frame from the first entity to the second entity including a field having the second value;

communicating a frame from the second entity to the first entity including a field having the second value; and wherein said step of resetting comprises the steps of:
setting the first state variable to a predetermined value;

communicating a frame from the first entity to the second entity indicating a reset condition and including a field having the predetermined value;

setting the second state variable to the predetermined value in response to communication of the frame indicating the reset condition; and communicating a frame from the second entity to the first entity acknowledging the reset condition and including a field having the predetermined value.

18. A method according to claim 17, wherein said step of resetting is followed by the steps of:

incrementing the first and second state variables to a third value;

communicating a frame from the first entity to the second entity including a field having the third value; and communicating a frame from the second entity to the first entity including a field having the third value.

19. A system for communicating between a first entity and a second entity over a wireless communications medium, the system comprising:

means for establishing a Data Link for communicating a message between the first entity and the second entity via Information Frames communicated between a first Data Link Layer at the first entity and a second Data Link Layer at the second entity;

means for transmitting an Information Frame addressed to said second Data Link Layer from said first Data Link Layer;

means, responsive to said means for transmitting an Information Frame, for determining whether the transmitted Information Frame is communicated to said second Data Link Layer;

means, responsive to said means for determining whether the transmitted Information Frame is communicated, for resetting said first and second Data Link Layers while maintaining said Data Link if a transmitted Information Frame fails to be communicated from said first Data Link Layer to said second Data Link Layer; and means, responsive to said means for resetting said first and second Data Link Layers, for transmitting an Information Frame addressed to said second Data Link Layer from said first Data Link Layer, after said first and second Data Link Layers are reset.

20. A system according to claim 19:

wherein said first means for transmitting comprises means for transmitting an Information Frame which indicates a normal condition for said Data Link;

wherein said means for resetting comprises:
means for resetting said first Data Link Layer;
means for communicating an Information Frame from said first Data Link Layer to said second Data Link Layer indicating a reset condition;

means for resetting said second Data Link Layer in response to communication of the Information Frame to said second Data Link Layer indicating a reset condition; and means for communicating a frame acknowledging the reset condition from said second Data Link Layer to said first Data Link Layer; and wherein said second means for transmitting comprises means for transmitting an Information Frame indicating a normal condition for said Data Link in response to communication of the frame acknowledging the reset condition to said first Data Link Layer.

21. A system according to claim 20:

wherein said first Data Link Layer includes a first state variable representing a sequence number of a next Information Frame to be communicated from said first Data Link Layer to said second Data Link Layer;

wherein said second Data Link Layer includes a second state variable representing a sequence number of a next Information Frame expected to be communicated to said second Data Link Layer from said first Data Link Layer;

wherein said means for resetting said first Data Link Layer comprises means for setting said first state variable to a predetermined value;

wherein said means for communicating an Information Frame indicating a reset condition comprises means for communicating an Information Frame indicating a reset condition and including a sequence number having the first predetermined value;

wherein said means for resetting said second Data Link Layer comprises means for setting said second state variable to the predetermined value; and wherein said means for communicating a frame acknowledging the reset condition comprises means for communicating a frame acknowledging the reset condition and including a sequence number having the predetermined value.

22. A system according to claim 19, further comprising:

means for storing a message at the first entity;

means, responsive to said means for storing a message, for converting a message into a first group of Information Frames; and means, responsive to said means for converting, for queuing the first group of Information Frames at said first Data Link Layer;

wherein said first means for transmitting comprises means for transmitting an Information Frame from the queued first group of Information Frames;

wherein said means for resetting said first Data Link Layer comprises means for discarding Information Frames queued at said first Data Link Layer;

wherein the system further comprises:

means for converting a stored message corresponding to discarded Information Frames into a second group of Information Frames; and means for queuing the second group of Information Frames at said first Data Link Layer; and wherein said second means for transmitting comprises means for transmitting an Information Frame from the queued second group of Information Frames.

23. A system according to claim 19, wherein said means for communicating an Information Frame indicating a reset condition comprises means for repeatedly transmitting Information Frames indicating a reset condition from said first Data Link Layer until a frame acknowledging the reset condition indication is communicated to said first Data Link Layer.

24. A system for communicating messages between a first entity and a second entity over a wireless communications medium, the system comprising:

means for establishing a Data Link for communicating a message between the first and second entities via frames;

means, positioned at the first entity, for transmitting a frame addressed to the second entity indicating a normal condition for said Data Link;

means, responsive to the wireless communications medium, for determining whether a frame transmitted from the first entity is acknowledged by the second entity;

means, responsive to said means for determining, for transmitting a frame from the first entity addressed to the second entity indicating a reset condition for said Data Link if a frame addressed to the second entity fails to be acknowledged;

means, positioned at the second entity and responsive to the wireless communications medium, for receiving the frame indicating the reset condition;

means, positioned at the second entity and responsive to said means for receiving, for transmitting a frame addressed to the first entity acknowledging the reset condition, in response to receipt of the frame indicating the reset condition at the second entity;

means, positioned at the first entity and responsive to the wireless communications medium, for receiving the frame acknowledging the reset condition; and means, positioned at the first entity and responsive to said means for receiving the frame acknowledging the reset condition, for transmitting a frame addressed to the second entity indicating a normal condition for said Data Link in response to receipt of the frame acknowledging the reset condition at the first entity.

25. A system according to claim 24 wherein the first entity includes a first state machine which controls transmission and reception of frames by the first entity, wherein the second entity includes a second state machine which controls transmission and reception of frames by the second entity, and further comprising:

means, responsive to said means for determining whether a frame is acknowledged, for resetting the first state machine to a predetermined state if a frame addressed to the second entity fails to be acknowledged; and means, responsive to said means for receiving the frame acknowledging the reset condition, for resetting the second state machine to a predetermined state in response to receipt of a frame indicating the reset condition.

26. A system according to claim 25, wherein the first state machine includes a first state variable representing a sequence number of a next frame to be transmitted by the first entity, wherein the second state machine includes a second state variable representing a sequence number of a next frame expected to be received from the first entity at the second entity, and:

wherein said means for resetting the first state machine comprises means for setting the first state variable to a predetermined value;

wherein said means for transmitting a frame indicating a reset condition comprises means for transmitting a frame indicating the reset condition and including a sequence number having the predetermined value;

wherein said means for resetting the second state machine comprises means for setting the second state variable to the predetermined value; and wherein said means for transmitting a frame acknowledging the reset condition comprises means for transmitting a frame acknowledging the reset condition and including a sequence number having the predetermined value.

27. A system according to claim 24, wherein said means for transmitting at least one frame indicating a reset condition comprises means for repeatedly transmitting frames indicating the reset condition until a frame acknowledging the reset condition indication is received at the first entity.

\* \* \* \* \*